United States Patent
Pham et al.

(10) Patent No.: US 7,904,631 B2
(45) Date of Patent: Mar. 8, 2011

(54) PROTOCOL INDEPENDENT BRIDGE

(75) Inventors: Hai D. Pham, Eden Prairie, MN (US);
Steve D. Huseth, Minneapolis, MN (US); Christopher E. Kikta, Pittsburgh, PA (US)

(73) Assignee: Honeywell International Inc., Morristown, NJ (US)

( * ) Notice: Subject to any disclaimer, the term of this patent is extended or adjusted under 35 U.S.C. 154(b) by 991 days.

(21) Appl. No.: 11/592,059

(22) Filed: Nov. 2, 2006

(65) Prior Publication Data

US 2008/0109581 A1    May 8, 2008

(51) Int. Cl.
*G06F 13/36* (2006.01)
*G06F 13/00* (2006.01)

(52) U.S. Cl. ............. 710/315; 710/106; 710/11; 710/58

(58) Field of Classification Search ............ 710/33, 710/58–61, 11–15, 105–106, 305–316
See application file for complete search history.

(56) References Cited

U.S. PATENT DOCUMENTS

| | | | | |
|---|---|---|---|---|
| 5,438,681 | A  * | 8/1995 | Mensch, Jr. | 716/17 |
| 6,157,689 | A  * | 12/2000 | Petty et al. | 375/370 |
| 6,401,159 | B1 * | 6/2002 | Wang | 710/315 |
| 6,728,795 | B1 * | 4/2004 | Farazmandnia et al. | 710/22 |
| 6,813,777 | B1 * | 11/2004 | Weinberger et al. | 725/76 |
| 7,418,031 | B2 * | 8/2008 | Jha et al. | 375/225 |
| 7,418,521 | B2 * | 8/2008 | Schroeder et al. | 709/249 |
| 2007/0283260 | A1* | 12/2007 | Sun | 715/700 |
| 2008/0109581 | A1* | 5/2008 | Pham et al. | 710/58 |
| 2008/0235416 | A1* | 9/2008 | Lu | 710/106 |

* cited by examiner

*Primary Examiner* — Christopher B Shin
(74) *Attorney, Agent, or Firm* — Schwegman, Lundberg & Woessner, P.A.

(57) ABSTRACT

A wireless bridge includes a first universal asynchronous receiver/transmitter (UART) for coupling to a serial bus that receives data packets. A protocol independent module has a timer set to a desired time to detect a start and/or an end of a data packet received from the serial bus. A wireless transceiver is coupled to the universal asynchronous receiver/transmitter for sending and receiving data packets.

20 Claims, 3 Drawing Sheets

US 7,904,631 B2

PROTOCOL INDEPENDENT BRIDGE

BACKGROUND

HVAC (heating, ventilation and air conditioning) control systems and other building control systems such as home comfort controls, building security and lighting controls utilize one or more central controllers that communicate with nodes that directly control equipment remote from the central controllers. In many installations, wires are used to connect the controllers with actuator controllers to establish communications between them. Wiring can be costly and difficult in some installations due to physical limitations such a brick, glass walls, and lack of permission by customers to run the wires.

One prior solution to provide communications without wires includes the use of wireless transceivers at the central master controllers and slave nodes, such as electronics thermostat module, actuator controllers, allowing them to communicate with each other via a master controller. However, there are many different communication protocols and configurations of the protocols in use by various manufacturers of equipment, and it is difficult to translate and implement so that they can communicate wirelessly without time consuming installation and configuration services.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein are implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wireless transmissions. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

Figure 1:
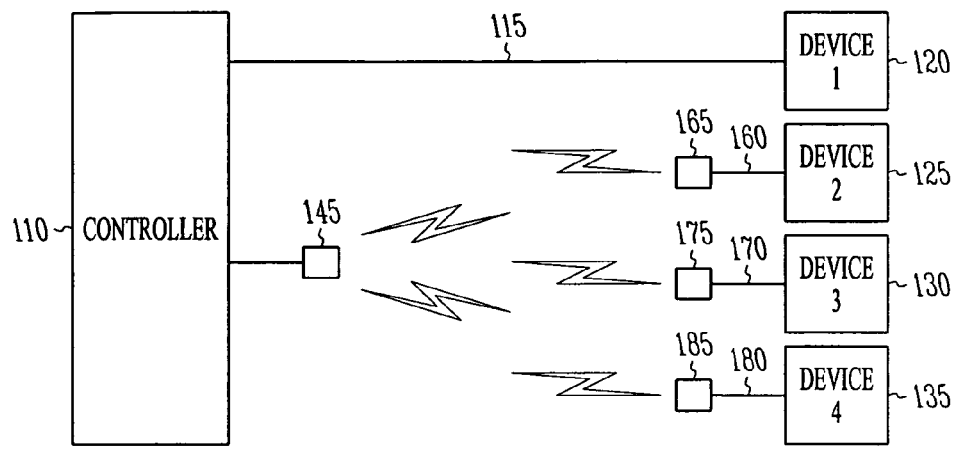
FIG. 1 is a block diagram of a system having a controller and multiple devices coupled wirelessly by bridge circuits according to an example embodiment.

FIG. 1 illustrates a system 110 having a controller that communicates via a hardwired serial bus, such as an IEEE RS-485 bus 115 to a device 120. Both controller 110 and device 120 have hardwired connection to the asynchronous multi-drop serial bus 115, and provide data in a asynchronous serial format to the hardwired bus. However, the format and protocols used by the devices may be different. Packet sizes may differ in one embodiment.

In FIG. 1, controller 110 is also shown communicating with further devices 125, 130 and 135. As shown in FIG. 1, the hardwire busses coupling the controller 110 and devices 125, 130 and 135, has been replaced with a wireless connection. Controller 110 has a hardwire connector 140 coupled directly to a wireless bridge circuit 145.

Device 125 has a hardwire connector 160 coupled to a wireless bridge circuit 165. Device 130 has a hardwire connector 170 coupled to a wireless bridge circuit 175. Device 135 has a hardwire connector 180 coupled to a wireless bridge circuit 185. In this embodiment, wireless bridge 145 communicates via a desired wireless protocol, such as IEEE 802.15.4 to wireless bridges 165, 175, 185 and many more. This architecture allows the controller 110 to send and receive data and commands wirelessly to devices 125, 130 and 135, without being reconfigured for using a wireless protocol, but merely by attaching the wireless bridges to existing hardwire connectors.

Figure 2:
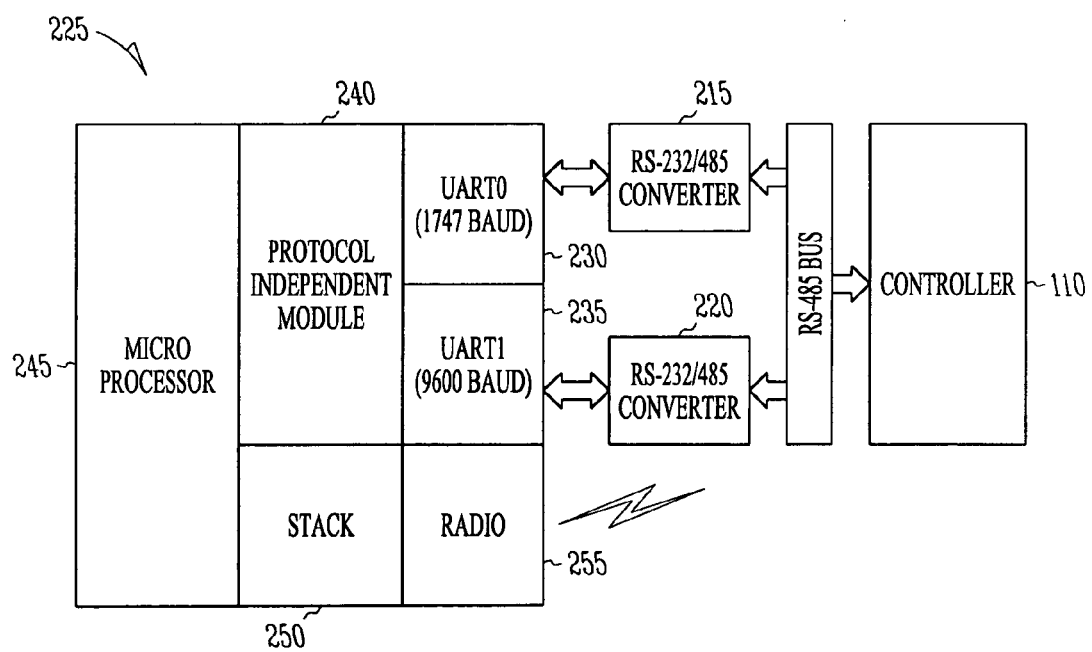
FIG. 2 is a block diagram illustrating further details of the bridge circuits of FIG. 1 according to an example embodiment.

Further detail of the connection between the wireless bridges and hardwire connectors of controllers and devices are shown in FIG. 2. Controller 10 is shown coupled to a hardwire bus 210. RS-485 Serial data from the hardwire bus 210 is converted to RS-232 serial data by converters 215 and 220 compatible with a wireless bridge 225. Wireless bridge 225 in one embodiment has two universal asynchronous receiver/transmitters (UARTs), 230 and 235 which operate at various baudrate, in this case they are 1747 baud and 9600 baud respectively consistent with the dual baud rates supported by the bus.

The UARTs 230 and 235 provide serial data to a protocol independent module 240, which converts the serial data into bytes, detects the end of a packet, and determines the number of bytes in the packet (packet length). Such module 240 may be a software module that is executed by circuitry, such as a microprocessor 245. The packets are provided to a stack 250 for transmission by a radio or transceiver 255. Transceiver 255 also receives data from other bridges, and such data is converted into serial data compatible with the hardwire bus for sending back to the attached device or controller 110.

Figure 3:
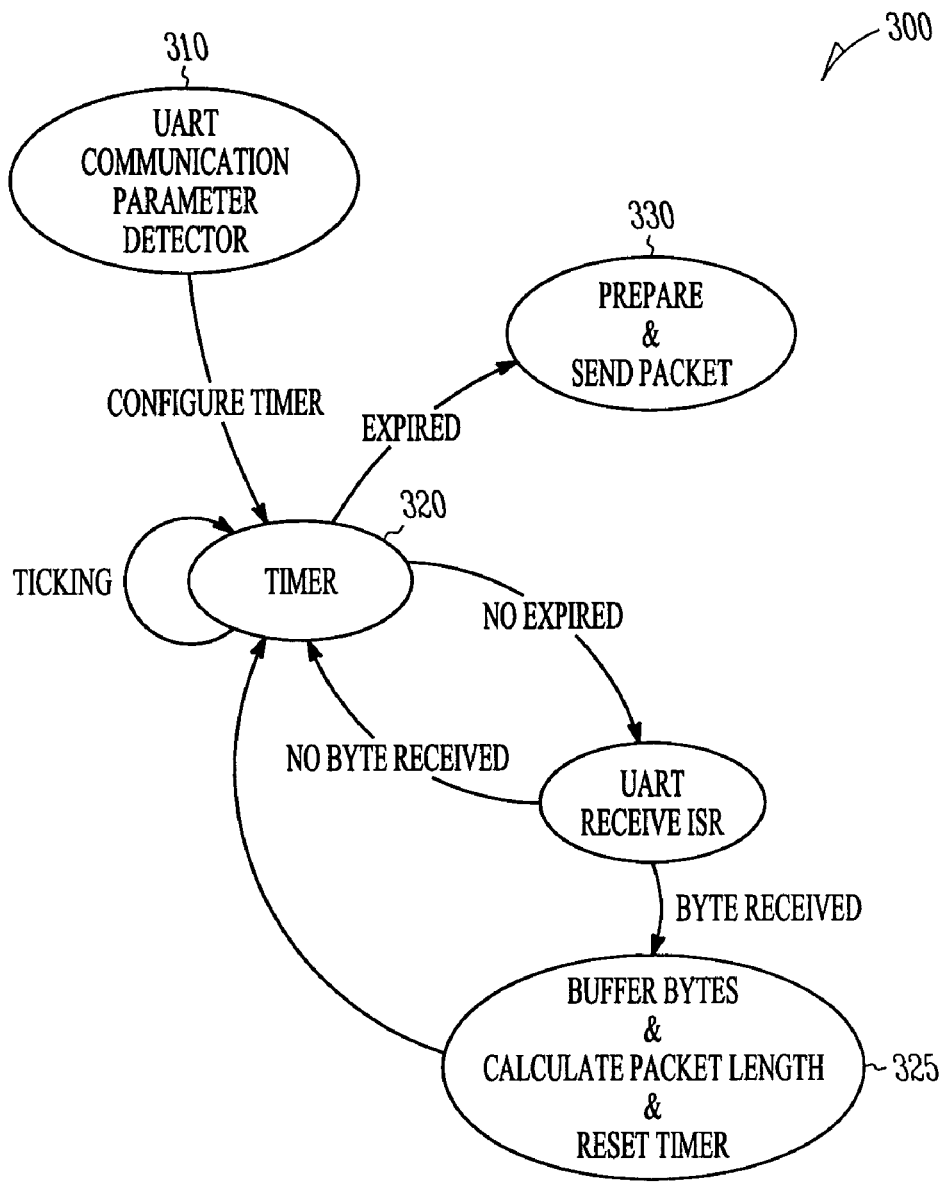
FIG. 3 is a diagram of an interrupt service routing for detecting packets in the bridge circuit of FIG. 2.

In one embodiment, the module 240 comprises an interrupt service routine illustrated in FIG. 3 at 300. The routine is set up or configured at 310 with bits per byte information such that it knows how to detect the baud rate and other serial communication parameters. In one embodiment, there are 8 bits of data, a start bit and a stop bit. A 1747 baud rate has a timing gap of ~6 ms between bytes. In further embodiments, there may also be 9600 baud which has a timing gap of ~1 ms between bytes. Timer configuration is set at 320. Every byte is received from a UART ISR at 315, the module 240 resets a one shot timer and bytes are assembled into bytes buffer and bytes counter is updated at 325. If the timer expires at 320, the module 240 assembles the received bytes into a packet, which may be sent wirelessly at 330. In one embodiment, the timer is set as a function of the baud rate of the UART, and the time expected between packets. Thus, the timer may be different for each of the different baud rate UARTs. In one embodiment, the timer is set as low as possible, such as 2-3 milliseconds for a baud rate of 9600, and to avoid the chance that a next packet will start to arrive prior to the timer expiring. If another byte is received at 315, prior to the timer expiring or reaching a predetermined time, the timer is reset at 325. The timer value may vary significantly in different embodiments, and may generally be faster for slower baud rates.

When packets are received at transceiver 255, they are simply converted to serial data compatible with the hardwired bus, and sent to the device or controller 110.

Setting up and installing a system using the bridge is generally faster than setting up and installing a hard wired system. The bridges may be connected directly to the bus interfaces in the devices and controllers. The interrupt service routine and is subfunction is a protocol translator. It detects the start byte and end byte of the data format and provides message length. In one embodiment, addresses may be stored directly on the devices, and controllers may broadcast polling information that includes addresses. The devices respond to the poll with their address and device's data to establish communications.

In one embodiment, the wireless bridge circuits may be used to provide communication between devices and controllers that may be manufactured by different companies, utilizing different communication protocols over the hard wired bus. The wireless bridge circuit is thus protocol independent, and can greatly reduce the cost of providing communications between the controller and devices without the need for modifying them. They still operate exactly as they would have if a wire were connecting them.

Figure 4:
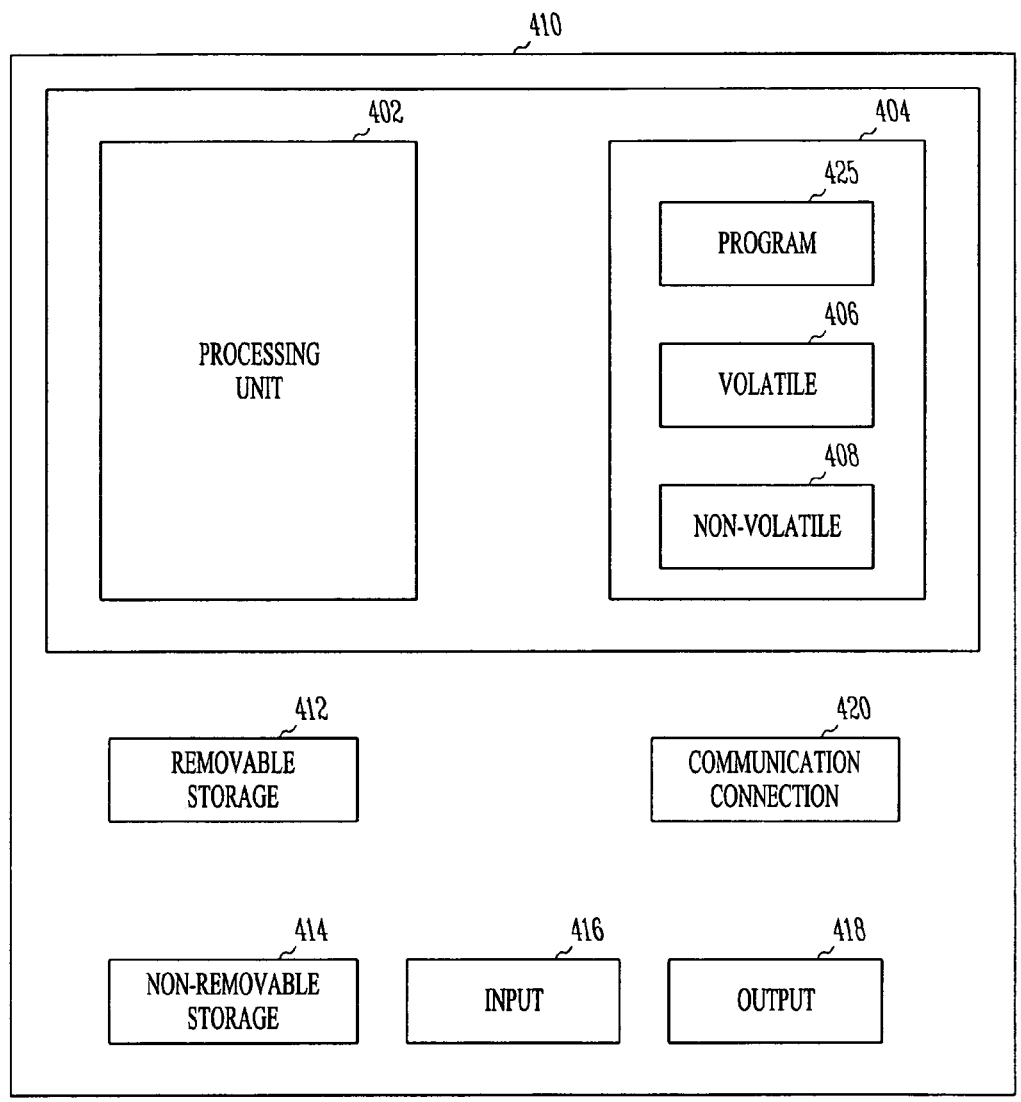
FIG. 4 is a block diagram of a typical computer system that executes methods according to an example embodiment.

Microprocessor 245 in one embodiment has an architecture similar to that shown in a block diagram in FIG. 4 of a computer system that executes programming for performing the above methods. A general computing device in the form of a computer 410, may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a computer-readable medium.

The wireless bridge provides wireless capabilities to existing hard wired HVAC (heating, ventilation and air conditioning) control systems and other building control systems such as home comfort controls, building security and lighting control systems. The bridge can eliminate costly wiring, and reduce installation times. Since it is protocol independent, it can work with many different wireless communication protocols and configurations of the protocols in use by various manufacturers of equipment. In one embodiment, the bridge may be used with equipment from manufacturers that utilize RS-485 master/slave or asynchronous half duplex interfaces.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A bridge comprising:
    a first universal asynchronous receiver/transmitter (UART) for coupling to a serial bus that receives data packets;
    a protocol independent module that has a timer set to run to a desired expiration time, wherein bytes of a packet are received from the serial bus while the timer is running, and wherein the protocol independent module upon expiration of the time, assembles received bytes into a packet; and
    a wireless transceiver coupled to the universal asynchronous receiver/transmitter to transmit the packet.

2. The bridge of claim 1 wherein the first UART is adapted to receive and transmit packets serially from an IEEE RS-485 data bus.

3. The bridge of claim 1 and further comprising a second UART for coupling to the serial bus that receives and transmit data packets at a baud rate different from that of the first UART.

4. The bridge of claim 3 wherein the first UART is a 1747 baud UART and the second UART is a 9600 baud UART.

5. The bridge of claim 1 wherein the bridge is protocol independent.

6. The bridge of claim 1 wherein the desired time is a function of baud rate of the serial bus and expected time between different packets.

7. The bridge of claim 1 wherein the first UART operates at 9600 baud and wherein the desired timer's expiration time is approximately between 2-3 milliseconds.

8. The bridge of claim 1 wherein two bridges are used to replace a wired connection between two devices.

9. The bridge of claim 1 wherein the timer is software or hardware implemented as a one shot timer.

10. A method comprising:
    coupling a wireless bridge circuit to a hardwire serial bus connection of each of a device and a controller, wherein the wireless bridge circuit performs a method comprising:
        receiving serial information from a serial hard wired bus;
        transmitting serial information to a serial hard wired bus;
        setting a timer having a set expiration time corresponding to when a stream of serial data is received, the expiration time corresponding to when the received serial data corresponds to a packet of data; and
        indicating a packet has been received after the expiration time.

11. The method of claim 10 and further comprising wirelessly receiving and sending packets between the wireless bridge circuits.

12. The method of claim 10 wherein the hard wire bus connection is an IEEE RS-232/485 wired bus connection.

13. The method of claim 10 wherein the serial information is received at 1747 baud or 9600 baud and various baud rates.

14. The method of claim 10 wherein the predetermined time is a function of baud rate of the serial bus and expected time between different packets.

15. The method of claim 14 wherein serial hard wired bus operates at 9600 baud and wherein the predetermined time is approximately between 2-3 milliseconds.

16. The method of claim 10 wherein the timer is a software or/and hardware implemented one shot timer.

17. A wireless bridge circuit for coupling to devices via a hard wired serial bus, the wireless bridge circuit comprising:
   means for receiving serial information from a serial hard wired bus;
   means for transmitting serial information to a serial hard wired bus;
   means for setting a timer having a set expiration time corresponding to when a stream of serial data is received, the expiration time corresponding to when the received serial data corresponds to a packet of data; and
   means for indicating a packet has been received after the expiration time.

18. The wireless bridge circuit of claim 10 and further comprising means for wirelessly sending and/or receiving packets between the wireless bridge circuits.

19. The wireless bridge circuit of claim 10 wherein the hard wired serial bus is an IEEE RS-232/485 wired connection.

20. The wireless bridge circuit of claim 10 wherein the timer is a software or hardware implemented one shot timer and wherein the predetermined time is a function of baud rate of the serial bus and expected time between different packets.

* * * * *